United States Patent [19]
Gleim

[11] Patent Number: 5,148,423
[45] Date of Patent: Sep. 15, 1992

[54] METHOD OF AND CIRCUITRY FOR COMPENSATING OFFSET VOLTAGES IN A FOCUSING AND/OR TRACKING CIRCUIT

[75] Inventor: Günter Gleim, Villingen-Schwenningen, Fed. Rep. of Germany

[73] Assignee: Deutsche Thomson-Brandt GmbH, Villingen-Schwenninger, Fed. Rep. of Germany

[21] Appl. No.: 769,331

[22] Filed: Sep. 30, 1991

Related U.S. Application Data

[63] Continuation of Ser. No. 378,252, Jul. 11, 1989, abandoned.

[30] Foreign Application Priority Data

Jul. 15, 1988 [DE] Fed. Rep. of Germany ....... 3824039

[51] Int. Cl.$^5$ .............................................. G11B 7/00
[52] U.S. Cl. ............................. 369/44.29; 369/44.29; 369/44.27; 369/44.25
[58] Field of Search ............... 369/44.23, 44.24, 44.25, 369/44.34, 44.41, 44.35, 32, 44.36, 110, 124, 44.32, 44.29, 44.27

[56] References Cited

U.S. PATENT DOCUMENTS

| | | | |
|---|---|---|---|
| 4,603,410 | 7/1986 | Yoshida | 369/44.34 |
| 4,707,648 | 11/1987 | Minami | 369/44.35 |
| 4,855,983 | 8/1989 | Arai | 369/44.34 |
| 5,050,151 | 9/1991 | Kurz | 369/44.29 |

*Primary Examiner*—Roy N. Envall, Jr.
*Assistant Examiner*—Nabil Hindi
*Attorney, Agent, or Firm*—Max Fogiel

[57] ABSTRACT

A method for compensating offset voltages selectively in a focusing circuit that focuses a beam from a source of light on a recording medium and in a tracking circuit that positions a beam of light on data storage tracks on a recording medium. A beam of light reflected from the recording medium is directed onto a photodetector which has a plurality of photodiodes. The difference of the output voltages from the photodiodes is taken for generating an error signal which is stored as a reference during a first stage in open or closed state of the circuit selected. The selected circuit is then closed and a compensation parameter is supplied in a second stage to controls in the selected circuit. The compensation parameter is then varied until the error signal is substantially equal to the stored reference. The compensation of the offset voltages is independent of the tracking circuit, and the offset voltages in the focusing circuit can be compensated when the tracking circuit is closed.

18 Claims, 9 Drawing Sheets

METHOD OF AND CIRCUITRY FOR COMPENSATING OFFSET VOLTAGES IN A FOCUSING AND/OR TRACKING CIRCUIT

The present application is a continuation of the parent application Ser. No. 378,252 filed Jul. 11, 1989, now abandoned.

BACKGROUND OF THE INVENTION

The invention concerns a method of compensating offset voltages in a focusing circuit that focuses a beam from a source of light on a recorded medium and/or in a tracking circuit that positions the beam of light on the data-storage tracks on the recorded medium, whereby the beam is reflected from the medium onto a photodetector that consists of several photodiodes and whereby a focusing and/or tracking error signal is derived from the output voltages of the photodiodes by constructing the difference between them.

In equipment for playing back data that can be read out of the data-storage tracks on a recorded medium with an optical pick-up, a beam of light is focused on the recorded medium by a focusing circuit and positioned on the data-storage tracks on the medium by a tracking circuit. The optical pick-up in such equipment—compact-disk players, optico-magnetic equipment for recording and playing back, equipment for recording and playing back DRAW disks, and videodisc players for example—includes a laser diode, several lenses, a prismatic beam divider, a refraction grating, and a photodetector. An optical pick-up of this type is described in Electronic Components and Applications 6, 4 (1984), pages 209 to 215.

Lenses focus the beam of light emitted by the laser diode onto the compact disk, which relfects onto a photodetector. The data recorded on the disk and the actual value for the focusing circuit and for the tracking circuit are obtained from the signal leaving the photodetector. The aforesaid literature calls the actual value of the focusing circuit the focusing error and the actual value of the tracking circuit the radial-tracking error.

The focusing circuit is controlled by a coil. An objective lens travels along an optical axis through the coil's magnetic field. The focusing circuit displaces the lens to ensure that the beam of light emerging from the laser diode is constantly focused on the compact disk. The tracking circuit, which is often called a radial drive mechanism, displaces the optical pick-up radially in relation to the disk, positioning the beam on the spiral data-storage tracks on the disk.

The radial drive mechanism in some equipment consists of a coarse-adjustment mechanism and a fine-adjustment mechanism. The coarse-adjustment mechanism can for example be a spindle that radially displaces the entire optical pick-up—the laser diode, the lenses, the prismatic beam divider, the refraction grating, and the photodetector. The fine-adjustment mechanism radially tilts the beam of light, at a prescribed acute angle for example, advancing the beam slightly along the radius of the disk due to the tilting motion alone.

FIG. 1 illustrates the photodetector PD in the optical pick-up of a compact-disk player wherein three laser beams L1, L2, and L3 are focused on a compact disk. A pick-up of this type is called a three-beam pick-up in the aforesaid reference.

Figure 1A:
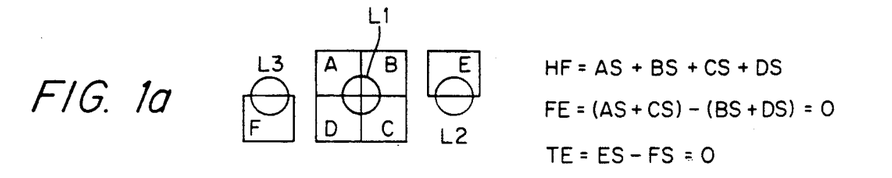
FIG. 1a is a schematic view and shows a photodetector in an optical pick-up of a compact disc player with three laser beams focused on a compact disc, and in which there is precise focus and precise tracking.

Middle beam L1 is the main beam, and beams L2 and L3 are beams of the +1st and −1st order generated from main beam L1 by a refraction grating.

Photodetector PD consists of four square photodiodes A, B, C, and D arranged in a square. Diagonally opposite the large square comprising photodiodes A, B, C, and D are two other photodiodes E and F, which are also square.

Main beam L1 is focused on photodiodes A, B, C, and D and generates a data signal $HF = AS + BS + CS + DS$ and a focusing-error signal $FE = (AS + CS) - (BS + DS)$. Forward beam L2 is focused on photodiode E and rear beam L3 on photodiode F. Both of these outer beams L2 and L3 generate a tracking-error signal $TE = ES - FS$. AS, BS, CS, DS, ES, and FS are the photoelectric voltages emitted by photodiodes A, B, C, D, E, and F respectively. Since an astigmatic collimator lens is positioned in the path of the main beam L1 in the optical pick-up, the beam will be circular when precisely focused on the large square that comprises photodiodes A, B, C, and D and will be elliptical when it is out of focus.

FIG. 1a illustrates precise focus and precise tracking, which will be described hereinafter. Since the spot of light produced on the large square by main beam L1 is circular, focusing-error signal $FE = (AS + CS) - (BS + DS) = 0$, and the zero tells the focusing circuit that the focus is precise.

Figure 1B:
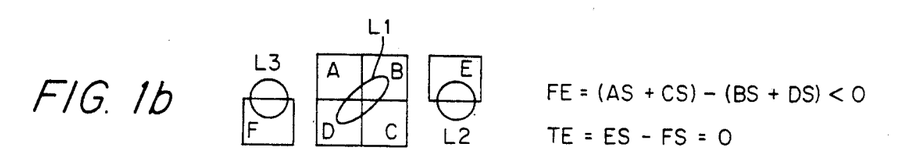
FIG. 1b corresponds to the photodetector in which there is imprecise focus due to the lens being too far from the compact disc.

FIG. 1b illustrates imprecise focus deriving from the lens being too far from the compact disk. Focusing-error signal $FE = (AS + CS) - (BS + DS) < 0$, and the negative value tells the focusing circuit that the distance between the lens and the disk is too great. The controls in the focusing circuit accordingly displace the lens toward the disk until focusing-error signal FE becomes zero again.

Figure 1C:
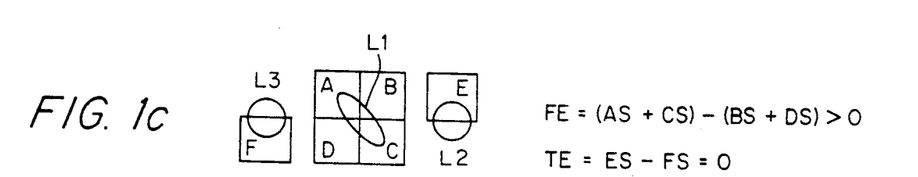
FIG. 1c corresponds to the opposite type of imprecise focus in FIG. 1b, due to the lens being too near the compact disc.

FIG. 1c illustrates the opposite type of imprecise focus deriving from the lens being too near the compact disk. Focusing-error signal is positive—$FE = (AS + CS) - (BS + DS) > 0$, and the positive value tells the focusing circuit that the lens is too near the disk. The controls accordingly displace the lens away from the disk until focusing-error signal FE becomes zero.

How the tracking circuit operates will now be explained.

The beams L1, L2, and L3 illustrated in FIGS. 1a, 1b, and 1c are precisely on the track, and tracking-error signal $TE = ES - FS = 0$.

Figure 1D:
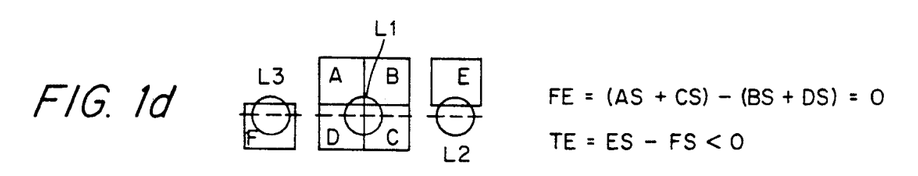
FIG. 1d illustrates the condition of the photodetector when the light beams are to the right of the track.

FIG. 1d illustrates beams L1, L2, and L3 to the right of the track. Tracking-error signal is negative—$TE = ES - FS < 0$. The controls in the tracking circuit displace the optical pick-up to the left until tracking-error signal is TE becomes zero.

Figure 1E:
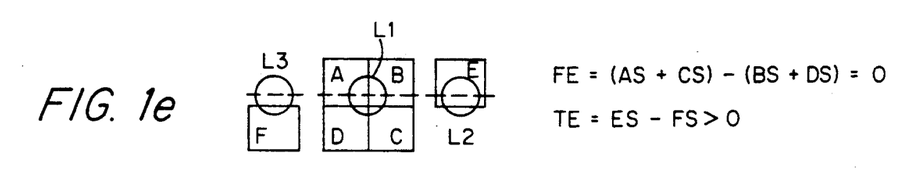
FIG. 1e illustrates the situation of the photodetector with the beams to the left of the track.

In the opposite situation, shown in FIG. 1e, with the beams to the left of the track, the tracking-error signal becomes positive—$TE = ES - FS > 0$, and the controls in the tracking circuit displace the optical pick-up to the right until tracking-error signal TE becomes zero.

The unobjectionable playback of data—whether audio and video in a videodisc player or audio alone in a compact-disk player—requires, in addition to precise focusing of the beam on the videodisc or compact disk, precise tracking over the disk.

The variable amplifier in the focusing circuit is, however, like any other variable amplifier, affected by an offset voltage at a level that is both dependent on temperature and subject to long-term drift. The offset-voltage drift is caused, along with other parameters in an amplifier by the amplifier aging.

Focusing-error signal $FE=(AS+CS)-(BS+DS)$ is constructed in a differential amplifier. Since the differential amplifier is also affected by an offset voltage and since photodiodes A, B, C, and D emit are not ideal and will emit different voltages or currents at the same light density, the situation is another source of detrimental offset voltages.

To prevent the playback of data from being detrimentally affected by offset voltages, as many offset voltages as possible must be compensated. Compensation, however, can be carried out only approximately by manually adjusted potentiometers because they cannot take changes in the offset voltages due to temperature fluctuations and the aging of specific components into account.

SUMMARY OF THE INVENTION

The object of the invention is accordingly to provide a method of compensating offset voltages in a focusing and/or tracking circuit such as to allow automatic compensation.

This object can be attained in accordance with the invention in that, when the circuit is closed, the focusing-error or tracking-error signal is compared with a prescribed reference and in that a compensation parameter is supplied to the controls in the focusing and/or tracking circuit and varied until the focusing-error and/or tracking-error signal coincides with the reference.

A second object can also be attained in accordance with the invention in that a compensation parameter is added to the focusing-error and/or tracking-error signal during an initial stage with the circuit either open or closed and with the photodiodes uniformly illuminated and is varied until the sum coincides with a reference, in that the focusing-error and/or tracking-error signal is compared with another reference during a second stage with the circuit closed, and in that another compensation parameter is supplied to the controls in the focusing and/or tracking circuit and is varied until the focusing-error and/or tracking-error signal coincides with the reference.

A third object can also be attained in that the focusing-error and/or tracking-error signal is stored as a reference during an initial stage with the circuit either open or closed and with the photodiodes uniformly illuminated and in that a compensation parameter is supplied to the controls in the circuit during a second stage with the circuit closed and is varied until the focusing-error and/or tracking-error signal coincides with the stored reference.

DESCRIPTION OF THE PREFERRED EMBODIMENTS

The individual procedures in accordance with the invention will now be described with reference to the example of a focusing circuit and to the circuitry illustrated in the figures.

Figure 2:
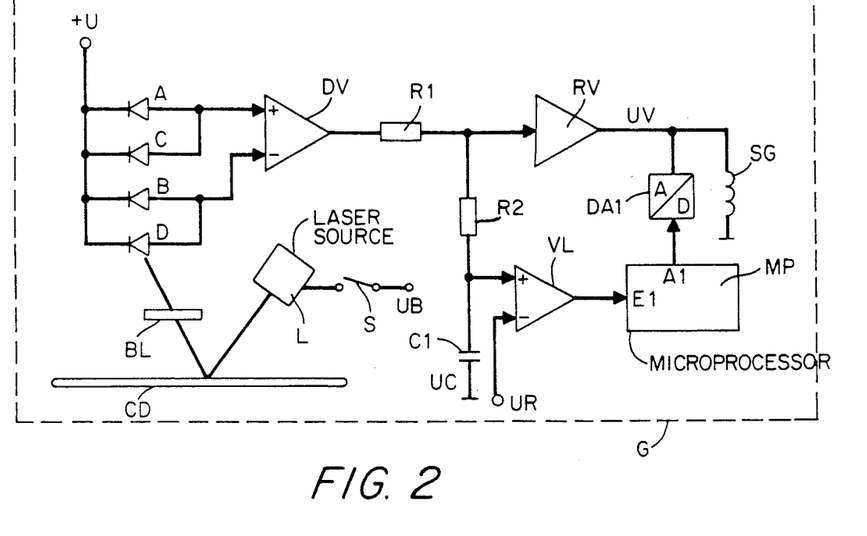
FIG. 2 is a schematic diagram and shows a circuit for carrying out a first method according to the present invention.

A voltage $+U$ is according to FIG. 2 at the interconnected cathodes of photodiodes A, B, C, and D. The interconnected anode of photodiodes A and C are connected to the adding input terminal and the interconnected anodes of photodiodes B and D to the subtracting input terminal of a differential amplifier DV. The output terminal of differential amplifier DV is connected by way of a resistor R1 to the input terminal of a variable amplifier RV and by way of another resistor R2 to the non-inverting input terminal of a comparator VL. The non-inverting input terminal of comparator VL is at reference potential UC by way of a capacitor C1. At the inverting input terminal of comparator VL is a reference voltage UR. The output terminal of comparator VL is connected to the input terminal E1 of a microprocessor MP. The output terminal A1 of microprocessor MP is connected to the input terminal of a digital-to-analog converter DA1. The output terminal of digital-to-analog converter DA1 is connected to the output terminal of variable amplifier RV and to one terminal of controls SG at potential UV. The other terminal of controls SG, which are in the form of a coil, is at reference potential.

The arrangements shown in FIGS. 2 to 6 are located in a housing G for example, the housing of a compact disc player, or in some other housing of the player, so that no light can strike the photodiodes A, B, C, and D. To achieve the condition that light does not reach the photodiodes, the light source L is switched off by a switch S, or the light reflected from the compact disc CD is screened or shut off by a diaphragm or shutter BL. Light from the light source L is focused on the compact disc CD, and this light is reflected from the compact disc onto the photodetector with the four photodiodes A, B, C, and D.

To facilitate comprehension of the circuitry, let it be initially assumed that the focusing circuit is composed of ideal components that have no offset voltage.

When the focus is precise, main beam L1 produces a circle on the four photodiodes A, B, C, and D as illustrated in FIG. 1a. Since each photodiode A, B, C, and D accordingly receives light of the same intensity and converts it into an electric current, equal voltages or currents will be emitted. Since variable amplifier RV is also assumed to be ideal, the voltage at its output terminal and hence at one terminal of controls SG will be zero. Controls SG, which are often called an actuator, accordingly displace the lens in the optical pick-up until the voltage at the output terminal of variable amplifier RV become zero. Assuming that the components are ideal, the focus will be precise because the voltage at the output terminal of differential amplifier DV is also zero.

Let it now be assumed that variable amplifier RV is affected by an offset voltage but that differential amplifier DV and photodiodes A, B, C, and D are ideal.

Controls SG will displace the lens until the voltage at the output terminal of variable amplifier RV becomes zero. Since variable amplifier RV is an actual component, the voltage entering and hence the voltage leaving the amplifier will differ from zero. In the position in which the lens is secured by the coil, main beam L1 will no longer be circular but, as illustrated in FIG. 1b or 1c, slightly elliptical, indicating that the focus is not precise.

To attain precise focus by compensating the offset voltage from variable amplifier RV, the voltage at the output terminal of differential amplifier DV is compared in comparator VL with reference voltage UR, which is zero in the present case. Microprocessor MP now varies the digital values at its output terminal A1, which digital-to-analog converter DA1 converts into an analog voltage and supplies to controls SG, until the comparator VL at the input terminal E1 of microprocessor MP indicates that the voltage at the output terminal of differential amplifier DV is zero. Since the lens is now focusing main beam L1 in the form of a circle on photodiodes A, B, C, and D, the focus is precise. Once comparator VL informs microprocessor MP that the focus is precise because the voltage at the output terminal of differential amplifier DV is zero, the microprocessor will retain the value at its output terminal A1, resulting in a constantly analog compensation voltage from digital-to-analog converter DA1 at controls SG.

The equipment, a compact-disk player for example, is now ready to play. It is of particular advantage for the compensation to occur every time the player is turned on.

If, now, the offset voltage is variable amplifier RV changes, as the result of temperature fluctuations or aging for example, the voltage at the output terminal of differential amplifier DV will also change and will no longer coincide with reference voltage UR. Since comparator VL so indicates to the microprocessor when the player is turned on, the microprocessor can readjust the offset-compensation voltage and ensure optimum compensation.

An essential advantage of the circuitry illustrated in FIG. 2 is that the offset voltage in variable amplifier RV will be automatically compensated every time the compact-disk player is turned on.

The circuitry illustrated in FIG. 3 and intended for carrying out the procedure according to the present invention, will now be described and its operation explained.

Figure 3:
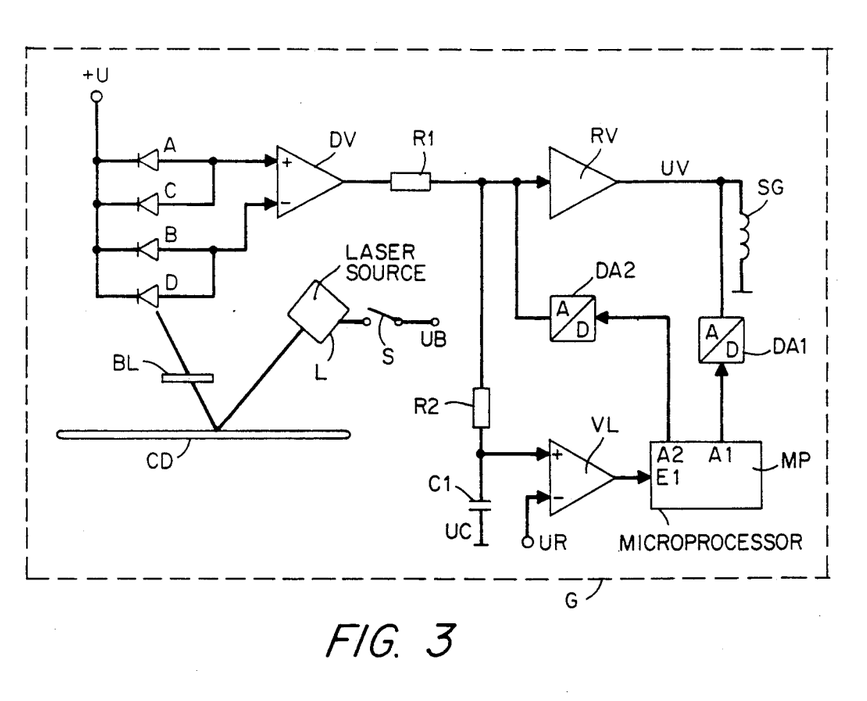
FIG. 3 is a schematic diagram of a circuit for carrying out a second method of the present invention.

The circuitry illustrated in FIG. 3 differs from the circuitry illustrated in FIG. 2 in that it includes another digital-to-analog converter DA2, the output terminal of which is connected to the output terminal of differential amplifier DV and the input terminal of which is connected to another output terminal A2 of microprocessor MP.

It is assumed in conjunction with the circuitry illustrated in FIG. 3 that both variable amplifier RV and differential amplifier DV are affected by an offset voltage. Photodiodes A, B, C, and D are considered to be actual components, meaning they are not precise identical and can emit different voltages or currents subject to light of the same intensity. Accordingly, when the focus is precise and the lens is focusing main beam L1 in the form of a circle on photodiodes A, B, C, and D as illustrated in FIG. 1a, the voltage at the output terminal differential amplifier DV will not be zero as desired, but will be positive or negative, +a for example.

During an initial stage with the focusing circuit either open or closed, photodiodes A, B, C, and D will be uniformly illuminated. This state can be easily attained by turning off the source of light and leaving the photodiodes in the dark. When the source of light is off, it makes no difference where the lens is or whether it is moving because no feedback can occur.

In this state, with the source of light turned off, the voltage at the output terminal of differential amplifier DV is compared with reference voltage UR in comparator VL.

The digital values emitted at the output terminal A2 of microprocessor MP are converted by digital-to-analog converter DA2 into an analog voltage. Microprocessor MP varies the digital values at its output terminal A2 until comparator VL indicates that the analog voltage at the output terminal of digital-to-analog converter DA2 has compensated the voltage at the output terminal of differential amplifier DV. The digital value at the output terminal A2 of microprocessor MP at that instant is retained. The measure ensures that the voltage at the input terminal of variable amplifier RV will be zero when the focus is precise and main beam L1 is producing a circle on photodiodes A, B, C, and D as illustrated in FIG. 1a.

In the second stage of the procedure, the source of light is turned on and the method continues as described with reference to FIG. 2.

Unfortunately there exists another offset parameter that has been ignored up to now. It is often called optical offset and derives from the opotical system in the pick-up. When the beam of light is precisely focused on the recorded medium, the beam will not, due to unavoidable defects in the optical components—the lenses, the prismatic beam divider, and the refraction grating—be circular, as it would be if those components were ideal, but will be slightly elliptical on photodiodes A, B, C, and D. When the beam is precisely focused on the recorded medium accordingly, the voltage at the output terminal of differential amplifier DV will not, in spite of the compensation, be zero as desired but will be positive of negative.

How this offset voltage, deriving from optical offset, can be compensated by means of the circuitry illustrated in FIG. 4 will now be explained.

This circuitry differs from the circuitry illustrated in FIG. 3 in that reference voltage UR cannot be modified. For this purpose one output terminal A3 of microprocessor MP is connected to the control input terminal of the source of reference voltage UR, which can for example be a digital-to-analog converter.

A constant value is selected for reference voltage UR during the first and second stages described with reference to FIG. 3. In addition to the first two stages of the procedure, there is another stage that compensates the aforesaid optical offset and occurs while the compact-disk player is being manufactured.

The test disk is inserted in the player. The digital values detected at the output terminals A1 and A2 of microprocessor MP during the first two stages are retained unmodified during the third stage. The source of light is turned on and focused precisely on the recorded medium, the test disk. Precise focus is determined by way of the test disk in that the jitter in the high-frequency signal is at a minimum when the focus is precise. The focus can, however, also be verified with a microscope for example. It is now decided how much the reference voltage UR will have to be modified to compensate the optical offset as well in that the offset voltage in differential amplifier DV has already been compensated during the first stage and the that in variable amplifier RV during the second stage. Reference voltage UR is accordingly varied until the jitter in the high-frequency signal is minimum, at which time the beam of light is precisely focused on the test disk. The accordingly obtained value of reference voltage UR is set and the player is ready to play.

When the offset voltage in differential amplifier DV or in variable amplifier RV changes during later operation, it can be compensated every time the equipment is turned on by the first and second stages of the procedure.

Figure 5:
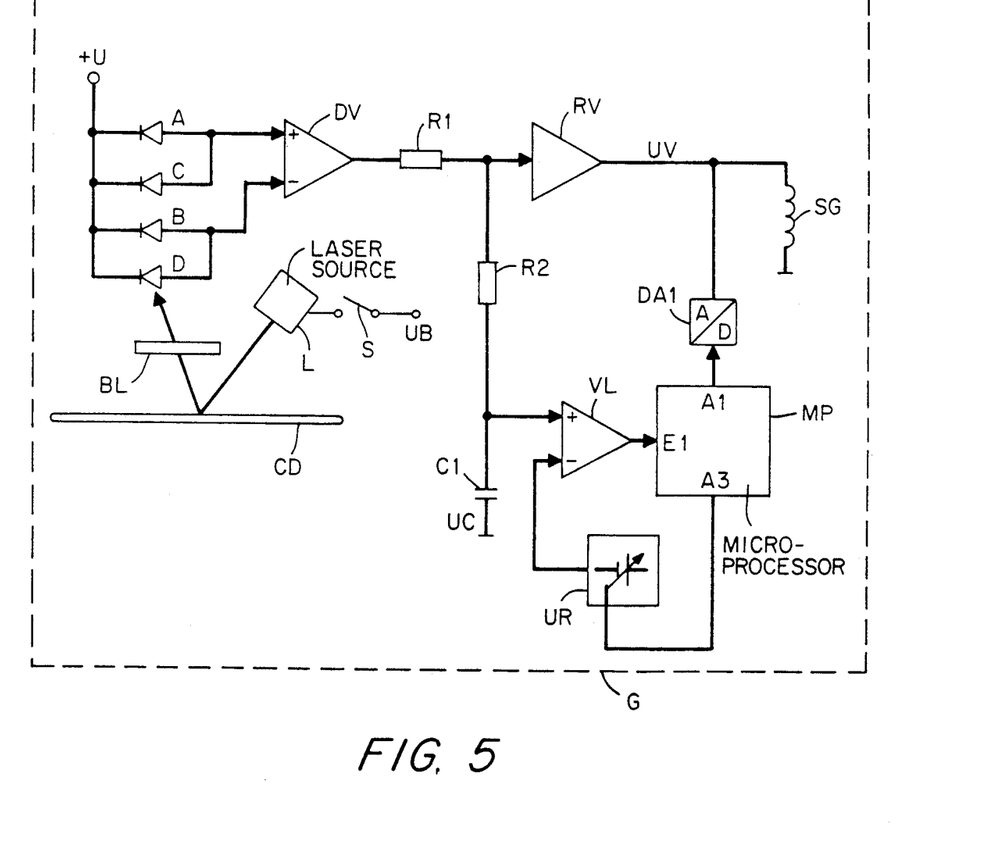
FIG. 5 is a schematic diagram of a circuit for carrying out a fourth method of the present invention.
Figure 6:
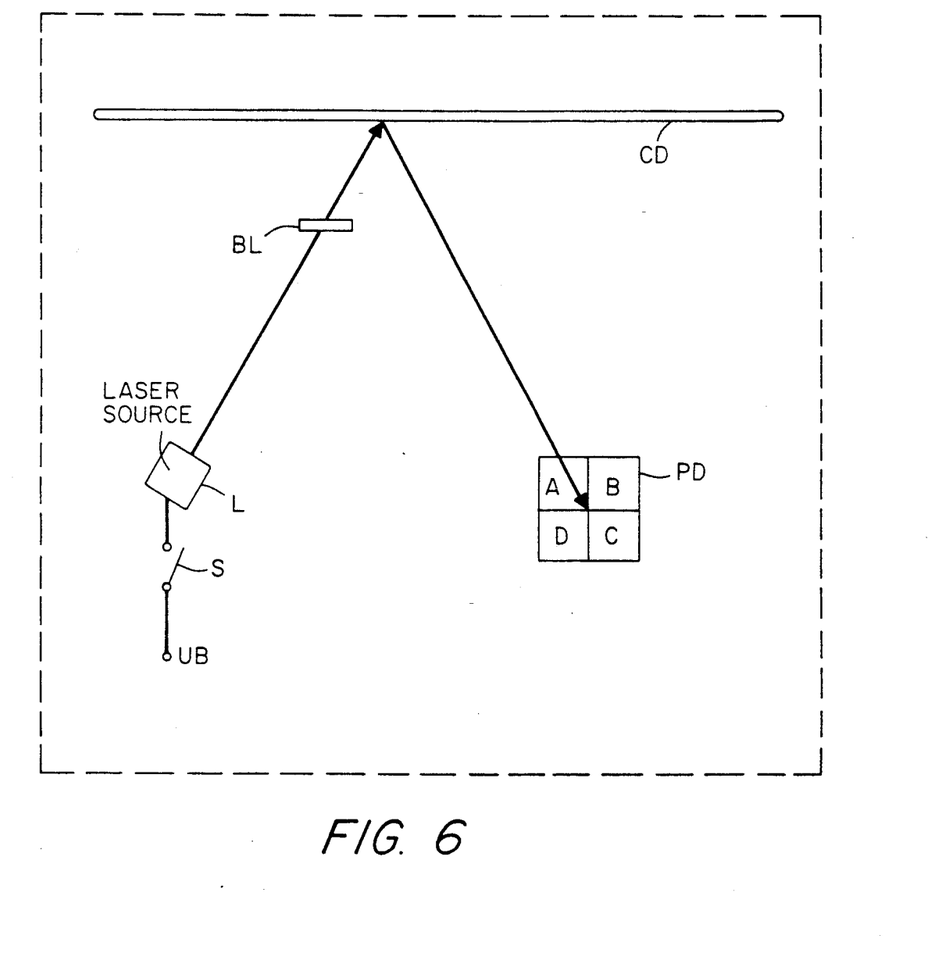
FIG. 6 is a schematic view which illustrates the interrelationship of the elements which inhibit light from striking the photodetector.
Figure 7:
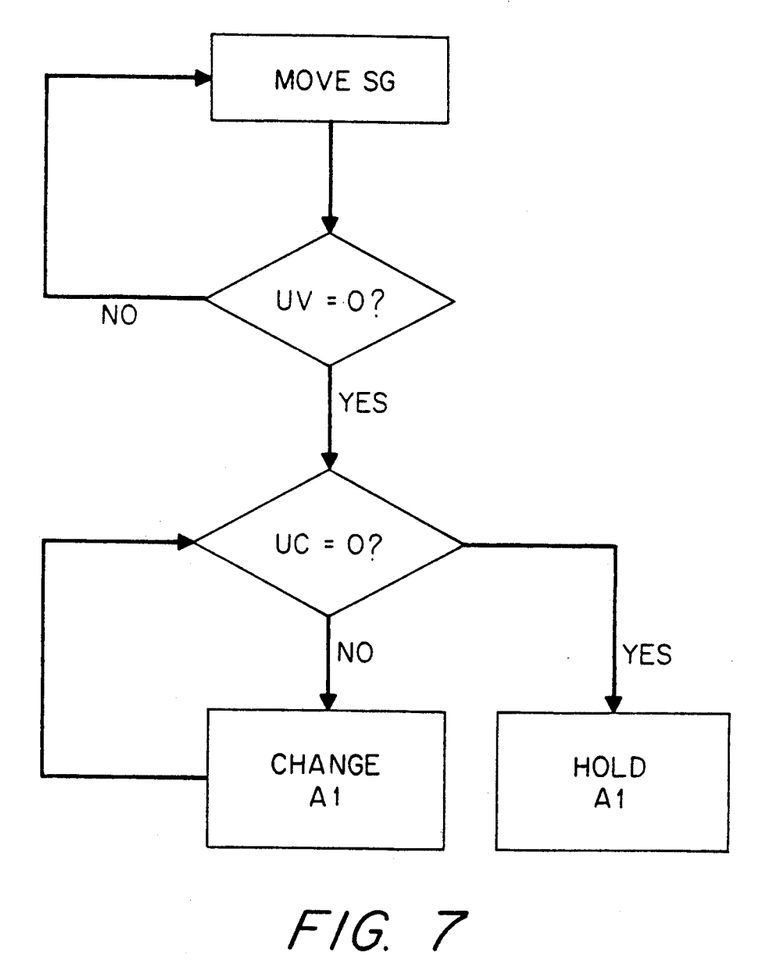
FIG. 7 is a flow diagram of procedures carried out by the microprocessor for one embodiment of the present invention.
Figure 8:
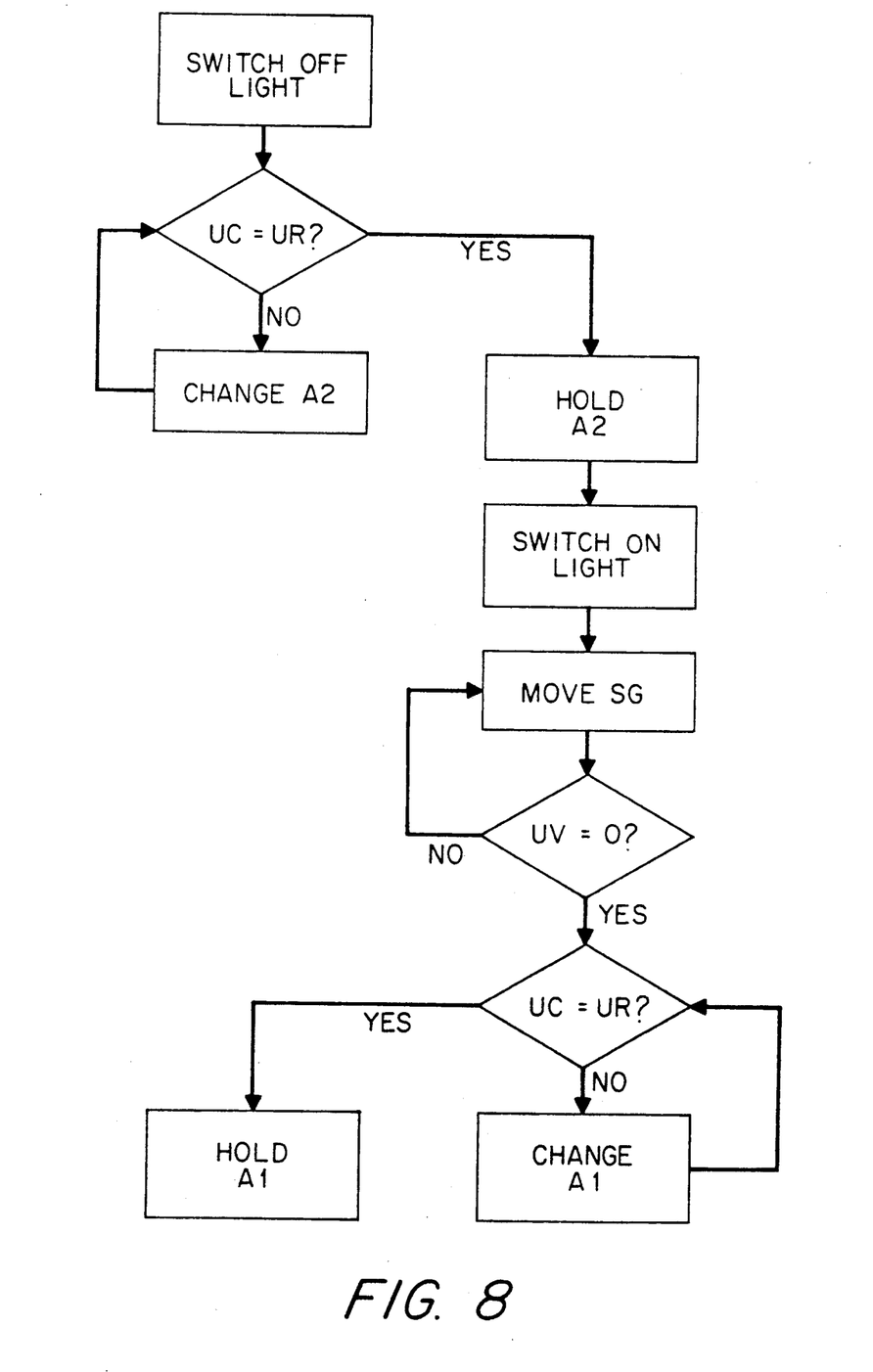
FIG. 8 is a flow diagram of another embodiment of the present invention.
Figure 9:
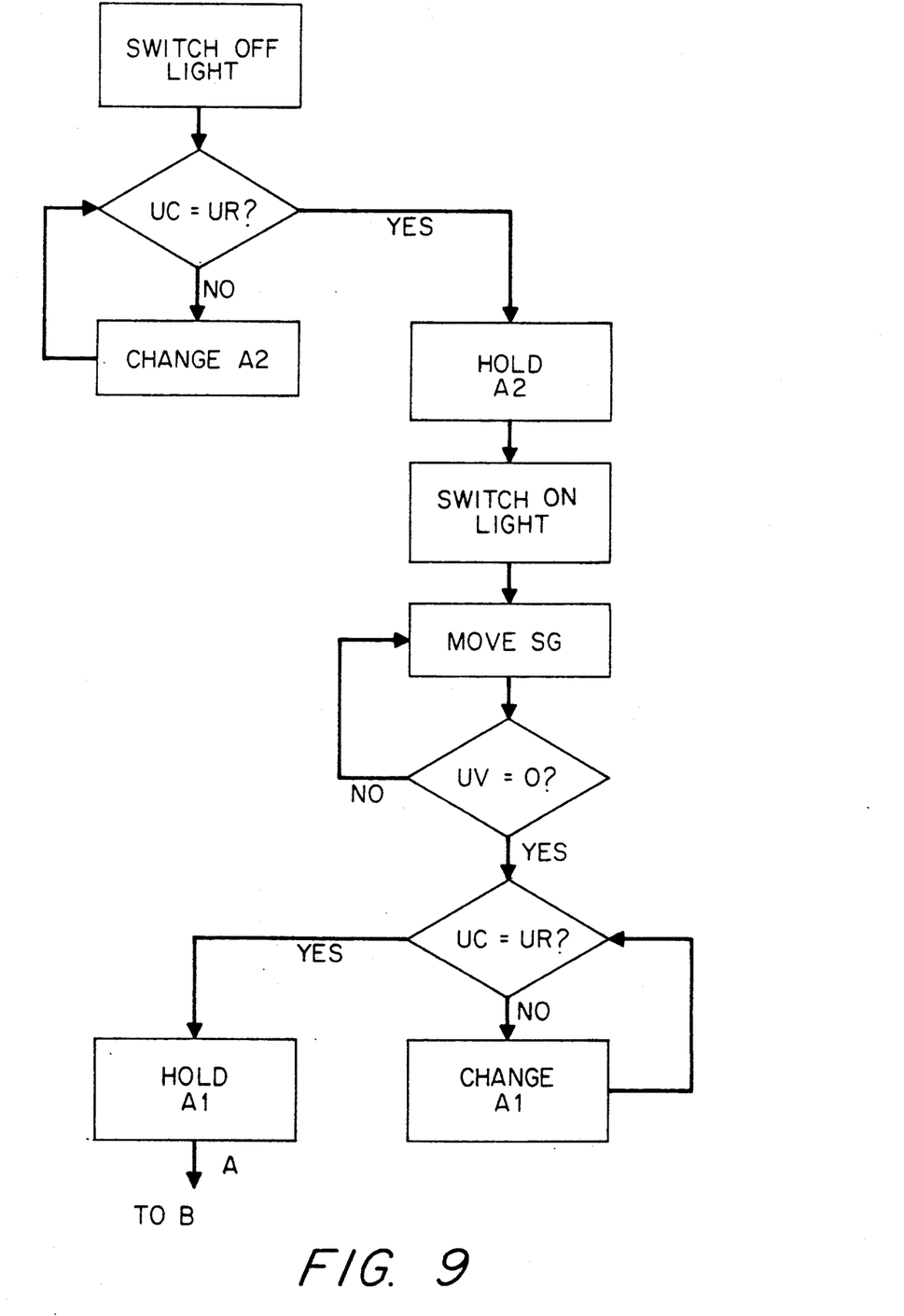
FIG. 9 is a flow diagram of procedures carried out by the microprocessor in a further embodiment of the present invention.
Figure 10:
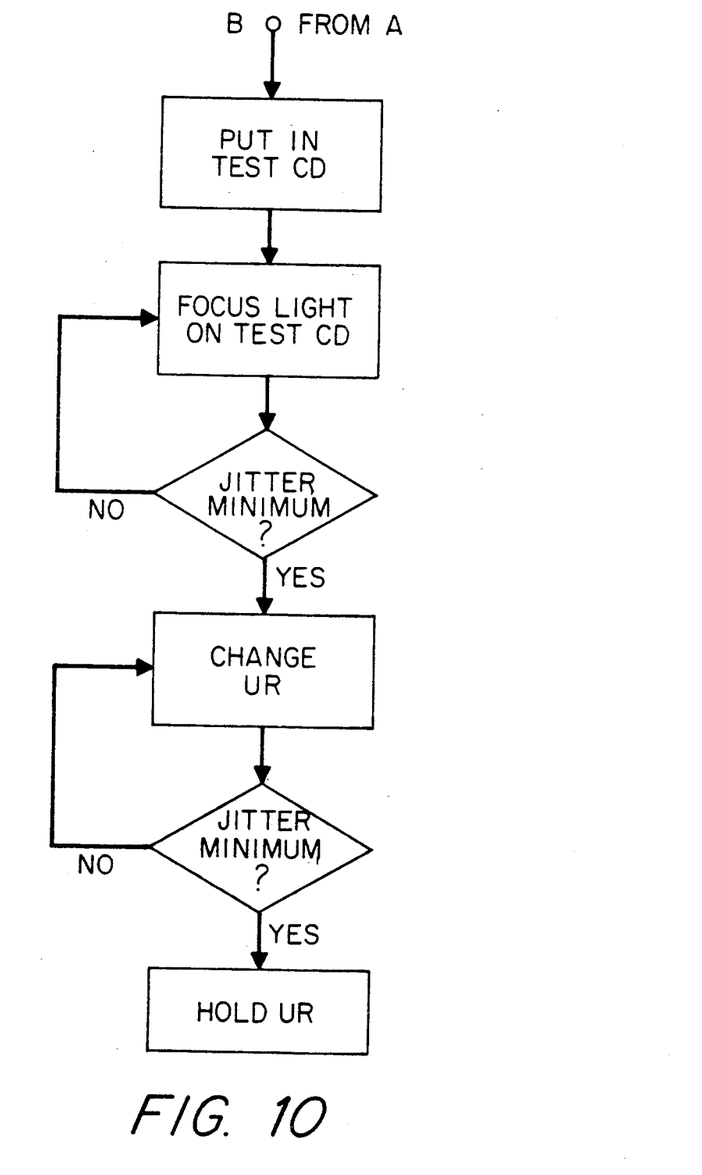
FIG. 10 is a continuation of the flow diagram of FIG. 9.

The circuitry illustrated in FIG. 5 and intended for carrying out the method according to the present invention, will now be described and its operation explained.

Figure 4:
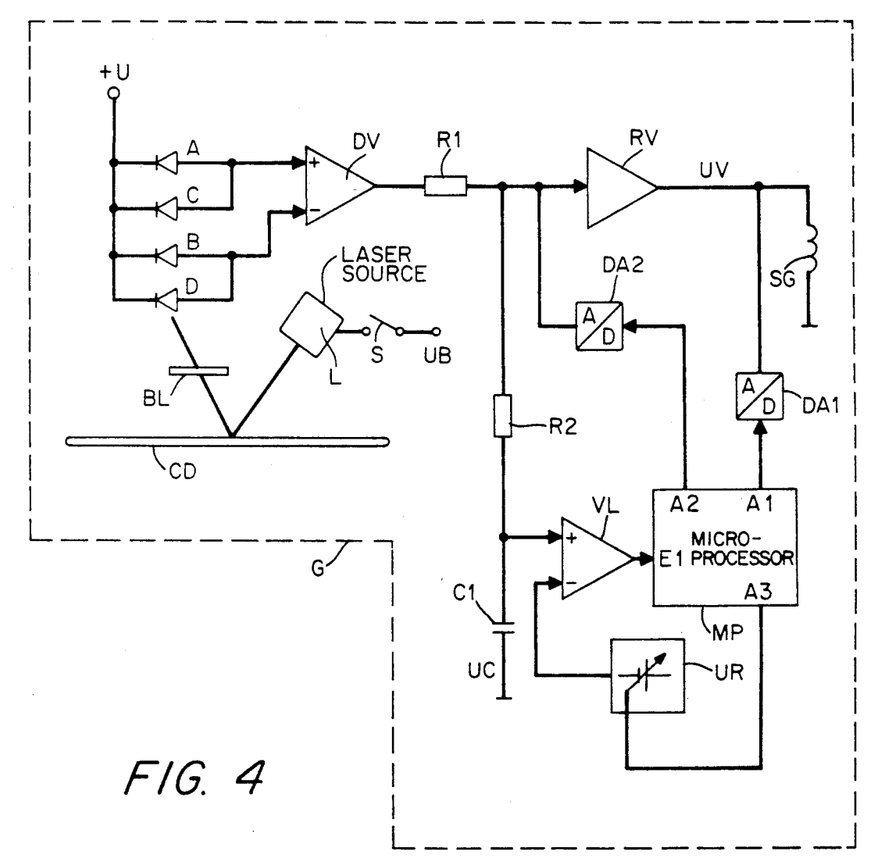
FIG. 4 is a schematic diagram of a circuit for carrying out a third method of the present invention.

It differs from the circuitry illustrated in FIG. 4 in that it lacks digital-to-analog converter DA2.

During an initial stage of the procedure, uniform illumination of photodiodes A, B, C, and D is ensured, as with the circuitry illustrated in FIG. 3, by turning off the source of light. In this state, which corresponds to that of precise focus, when main beam L1 produces a circle on photodiodes A, B, C, and D, microprocessor MP will vary reference voltage UR until comparator VL1 tells it that the reference voltage conincides with the voltage at the output terminal of differential amplifier DV, +a for example.

To compensate the aforesaid optical offset as well, the first stage of the procedure is modified as for the circuitry illustrated in FIG. 3. With the focusing circuit open or closed, the beam of light is precisely focused on the compact disk during the manufacturing stage and the focus is verified with a microscope or by determining the minimum jitter in the high-frequency signal with a test disk. Microprocessor MP will now vary reference voltage UR until comparator VL1 tells it that the voltage coincides with the voltage at the output terminal of differential amplifier DV, +b for example.

The second stage of the procedure is identical to that described with reference to the previous circuitry and occurs with the source of light on.

Without additional compensation, controls SG would maintain the lens in a position in which the voltage at the output terminal of variable amplifier RV is zero. The voltage at the input terminal of variable amplifier RV, however, is generally not +a or +b as desired in this case and as it would be if the focus were precise, but will be positive or negative depending on the size of the offset voltage in variable amplifier RV. Microprocessor MP will accordingly vary the digital value that occurs at its output terminal A1 and is converted by digital-to-analog converter DA1 into an analog voltage supplied to controls SG until comparator VL tells it that the voltage at the output terminal of differential amplifier DV coincides with reference voltage UR, which is +a or +b in the numerical example in question. The digital value at the output terminal A1 of microprocessor MP at that time is retained, with digital-to-analog converter DA1 ensuring that the correct compensation voltage will always occur at controls SG. The compact-disk player is now ready to play.

What is particularly advantageous in this circuitry is that both stages are carried out every time the player is turned on.

Manual compensation with a potentiometer while the equipment is being assembled is no longer necessary, nor must it be repeated in the event of temperature fluctuation or aging of the components because the offset voltages are automatically compensated every time the player is turned on.

What is claimed is:

1. A method for compensating offset voltages selectively in a focusing circuit that focuses a beam from a source of light on a recording medium and in a tracking circuit that positions a beam of light on data storage tracks on a recording medium, comprising the steps: directing a beam of light to a recording medium and reflecting the beam of light from said recording medium; directing the reflected beam of light onto a photodetector having a plurality of photodiodes with output voltages; taking the difference between said output voltages for generating an error signal from said output voltages; illuminating said photodiodes; adding a first compensation parameter to said error signal in open or closed state of the circuit selected to form a sum of said first compensation parameter and said error signal; varying said first compensation parameter until said sum is substantially equal to a first reference; closing thereafter selectively said focusing circuit and tracking circuit; comparing said error signal with a second reference; supplying a second compensation parameter selectively to controls in said focusing circuit and said tracking circuit; and varying said second compensation parameter until said error signal is substantially equal to said second reference.

2. A method as defined in claim 1, wherein said second reference is substantially equal to said first reference.

3. A method as defined in claim 1, including the step of retaining said first compensation parameter and said second compensation parameter; focusing precisely said beam of light on said recording medium with an instrument; and correcting said first reference and said second reference.

4. A method as defined in claim 1, including the step of inhibiting light from striking said photodiodes.

5. A method as defined in claim 4, including the step of switching off said source of light.

6. A method as defined in claim 4, wherein a diaphragm inhibits said light from striking said photodiodes in said inhibiting step.

7. A circuit arrangement for compensating offset voltages selectively in a focusing circuit that focuses a beam from a source of light on a recording medium and in a tracking circuit that positions beam of light on data storage tracks on a recording medium, comprising: a source of a light beam directed to a recording medium;

said beam of light being reflected from said recording medium; a photodetector receiving the reflected light beam and having a plurality of photodiodes without output voltages; means for taking the difference between said output voltages for generating an error signal from said output voltages; means for closing selectively said focusing circuit and tracking circuit; means for comparing said error signal with a predetermined reference; means for generating a compensation parameter and supplying selectively said compensation parameter to controls in said focusing circuit and said tracking circuit; means for varying said compensation parameter until said error signal is substantially equal to said reference; said photodiodes having cathodes connected together and to a predetermined voltage; a differential amplifier; said photodiodes having a first pair of anodes connected together and to a first input of said differential amplifier; said photodiodes having a second pair of anodes connected together and to a second input of said differential amplifier; a variable amplifier having an input connected to an output of said differential amplifier; a comparator having a first input connected to said output of said differential amplifier; said comparator having a second input connected to a reference voltage; a microprocessor having an input connected to an output of said comparator; a digital-to-analog converter connected between an output of said microprocessor and an output of said variable amplifier, said output of said variable amplifier being also connected to said controls.

8. A circuit arrangement as defined in claim 7, including a first resistor connected between said output of said differential amplifier and said input of said variable amplifier; a second resistor connected between said input of said variable amplifier and the first input of said comparator; a capacitor connected between said first input of said comparator and ground potential; said controls comprising coil means having one terminal connected to the output of said variable amplifier and having another terminal connected to ground potential.

9. A circuit arrangement as defined in claim 7, including means for varying said reference voltage connected to said second input of said comparator, said means for varying said reference voltage having a control input connected to a second output of said microprocessor.

10. A circuit arrangement as defined in claim 9, wherein said means for varying said reference voltage comprises a digital-to-analog converter.

11. A circuit arrangement for compensating offset voltages selectively in a focusing circuit that focuses a beam from a source of light on a recording medium and in a tracking circuit that positions a beam of light on data storage tracks on a recording medium comprising: a source of a light beam directed to a a recording medium, said beam of light being reflected from said recording medium; a photodetector receiving the reflected light beam and having a plurality of photodiodes with output voltages; means for taking the difference between said output voltages for generating an error signal from said voltages, said photodiodes being illuminated uniformly; means for adding a first compensation parameter to said error signal in open or closed state of the circuit selected to form a sum of said first compensation parameter and said error signal; means for varying said first compensation parameter until said sum is substantially equal to a first reference; means for closing thereafter selectively said focusing circuit and tracking circuit; means for comparing said error signal with a second reference; means for supplying a second compensation parameter selectively to controls in said focusing circuit and said tracking circuit; means for varying said second compensation parameter until said error signal is subatantially equal to said second reference; said photodiodes having cathodes connected together and to a predetermined voltage; a differential amplifier, said photodiodes having a first pair of anodes connected together and to a first input of said differential amplifier; said photodiodes having a second pair of anodes connected together and to a second input of said differential amplifier; a variable amplifier having an input connected to an output of said differential amplifier; a comparator having a first input connected to said output of said differential amplifier; said comparator having a second input connected to a reference voltage; a micropricessor having an input connected to an output of said comparator; a digital-to-analog converter having an input connected to first output of said microprocessor another digital-to-analog converter having an input connected to second output of said microprocessor; said varible amplifier having an output connected to said first digital-to-analog converter with input connected to said first out of said microprocessor; said output of said variable amplifier being also connected to said controls; said other digital-to-analog converter having an output connected to the input of said variable amplifier.

12. A circuit arrangement as defined in claim 11, including means for varying said reference voltage connected to said second input of said comparator and having a control input connected to a third output of said microprocessor.

13. A method for compensating offset voltages selectively in a focusing circuit that focuses a beam from a source of light on a recording medium and in tracking circuit that positions a beam of light on data storage tracks on a recording medium, comprising the steps: directing a beam of light to a recording medium and reflecting the beam of light from said recording medium; directing the reflected beam of light onto a photodetector having a plurality of photodiodes with output voltages; taking the difference between said output voltages for generating an error signal from output voltages; closing selectively said focusing and tracking circuit and comparing said error signal with a predetermined reference; generating a compensation parameter and supplying selectively said compensation parameter to controls in said focusing circuit and said tracking circuit; and varying said compensation parameter until said error signal is substantially equal to said reference in said comparing step; compensation of said offset voltages being independent of said tracking circuit, offset voltages in said focusing circuit being compensatable when said tracking circuit is closed.

14. A method for compensating offset voltages selectively in a focusing circuit that focuses a beam from a source of light on a recording medium and in a tracking circuit that positions a beam of light on data storage tracks on a recording medium, comprising the steps: directing a beam of light to a recording medium and reflecting the beam of light from said recording medium; directing the reflected beam of light onto a photodetector having a plurality of photodiodes with output voltages;, taking the difference between said output voltages for generating an error signal from said output voltages; illuminating said photodiodes uniformly; storing said error signal as a reference during a first stage in open or closed state of the circuit selected; closing the circuit selected; supplying a compensation parameter in a second stage to comtrols in the circuit selected; and varying said compensation parameter until said signal is substantially equal to said stored reference; compensation of said offset voltages being independent of said tracking circuit, offset voltages in said focusing circuit being compensatable when said tracking circuit is closed.

15. A method as defined in claim 14, wherein said beam of light is precisely focused on said recording medium; and verifying the focus with an instrument.

16. A method as defined in claim 15, wherein said instrument is a microscope.

17. A method as defined in claim 15, wherein the precise focus of said beam of light on said recording medium is verified by a test medium separate from said recording medium and by determining minimum jitter in a high-frequency signal.

18. A method for compensating offset voltages in a focusing circuit that focuses a beam from a source of light on a recording medium, comprising the steps of: directing a beam of light to a recording medium and reflecting the beam of light from said recording medium; directing the reflected beam of light onto a photodector having a plurality of photodiodes with output voltages; taking the difference between said output voltages with a difference amplifier for generating an error signal from said output voltages; supplying said error signal to a variable signal amplifier with an output in said focusing circuit; comparing the output of said variable signal amplifier with a predetermined reference; generating a compensation parameter and supplying said compensation parameter to controls in said focusing circuit, said variable signal amplifier amplifying said error signal; and varying said compensation parameter until said error signal at the output of said variable signal amplifier is substantially equal to said reference in said comparing step; compensation of said offset voltages in said focusing circuit being independent of a tracking circuit that positions said beam on data storage tracks on the recording medium; offset voltages in said focusing circuit being compensatable when said tracking circuit is closed, and without also compensating offset voltages in the tracking circuit.

* * * * *